May 20, 1941.  J. LYMAN  2,242,253
DEVIOMETER
Filed Jan. 13, 1938  2 Sheets-Sheet 1
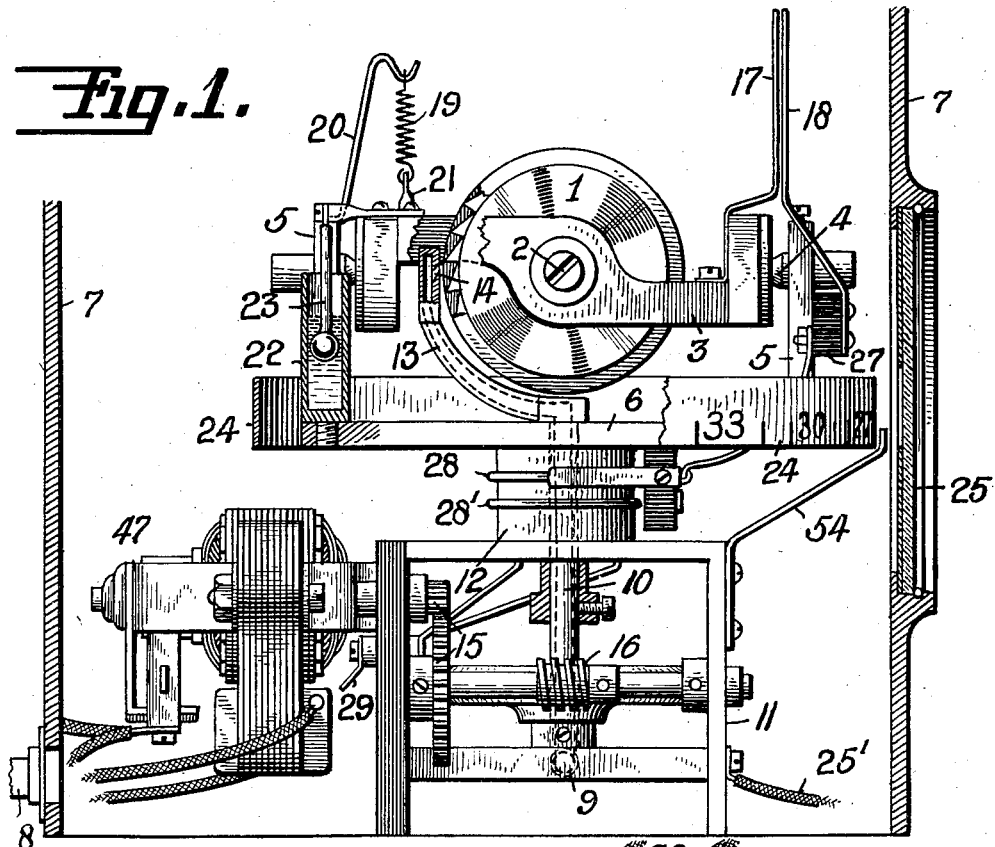
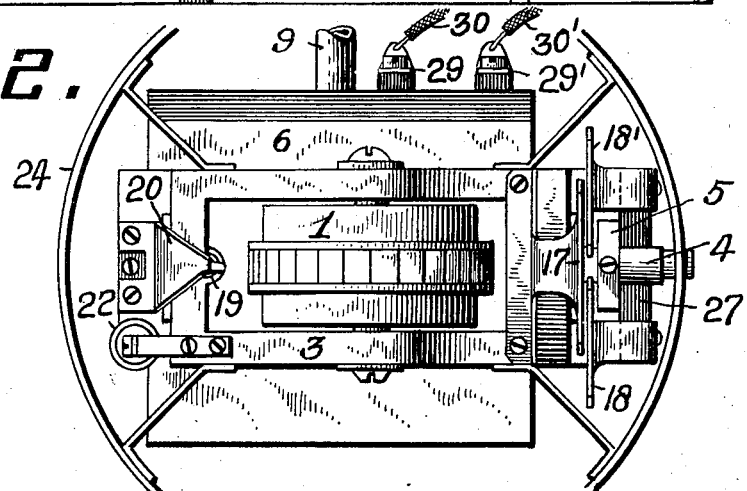
INVENTOR
JOSEPH LYMAN
HIS ATTORNEY May 20, 1941.  J. LYMAN  2,242,253
DEVIOMETER
Filed Jan. 13, 1938  2 Sheets-Sheet 2
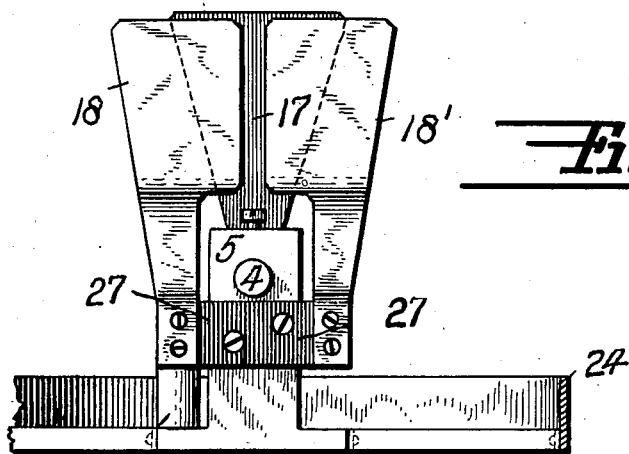
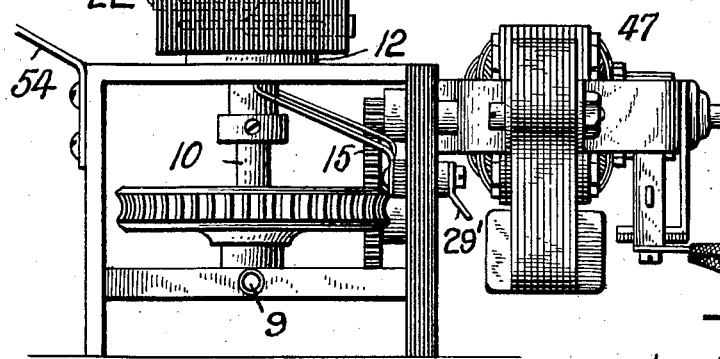
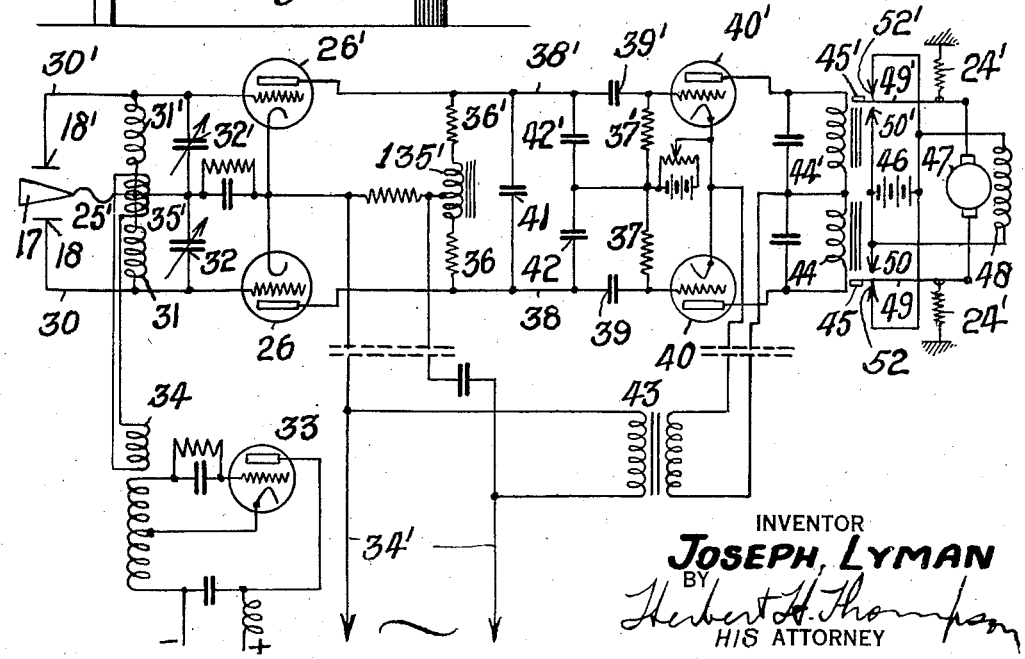
INVENTOR
JOSEPH LYMAN
BY
Herbert H. Thompson
HIS ATTORNEY Patented May 20, 1941

2,242,253

UNITED STATES PATENT OFFICE 2,242,253

DEVIOMETER

Joseph Lyman, Huntington, N. Y., assignor to Sperry Gyroscope Company, Inc., Brooklyn, N. Y., a corporation of New York Application January 13, 1938, Serial No. 184,783

9 Claims. (Cl. 33—204)

This invention relates, generally, to instruments for indicating the amount of deviation or turning movement of a craft, such as an aircraft, from its normal or straight-away course, and the invention has reference, more particularly, to a novel deviometer employing a constrained gyroscope for indicating the amount of turn.

The principal object of the present invention is to provide a novel instrument of the above character providing means for visually indicating turning movement and the amount thereof, whereby the operator of the craft employing the instrument may readily and instinctively correct the course of the craft as though he were observing some fixed object with relation to the turning movement of the craft.

Another object of the present invention lies in the provision of a novel deviometer of the above character, wherein a constrained gyroscope is mounted upon a rotatable platform or table and arranged, upon precession due to azimuthal turning of the craft, to actuate differential condenser means to cause operation of a follow-up system connected for rotating the platform or table in the direction opposite to the direction of turning of the craft, thereby eliminating precession of the gyroscope and holding the same angularly stationary in space, whereby indicator means carried by the platform serves to indicate the turn and the amount thereof.

A further object of the present invention is to provide a novel deviometer of the above character having 360° indicating means serving to accurately indicate total course change, whereby the device performs the function of a directional gyroscope, the differential condenser means being frictionless in operation so as to put no load on the gyroscope and hence enhancing the sensitivity of the device, such condenser means being included in tunable circuits that are inductively related to a source of high frequency oscillations, the said circuits feeding a thermionic rate circuit controlling the follow-up motor driving the rotatable gyroscope supporting table.

Other objects and advantages will become apparent from the specification, taken in connection with the accompanying drawings wherein one embodiment of the invention is illustrated.

In the drawings,

Fig. 1 is a part sectional view, in side elevation, of the novel deviometer of this invention.

Fig. 2 is a plan view of a portion of the structure of Fig. 1.

Fig. 3 is a view in front elevation of the instrument with its casing removed.

Fig. 4 is a wiring diagram of the circuits involved.

Similar characters of reference are used in all of the above figures to indicate corresponding parts.

Referring now to the drawings, the gyroscope is shown as comprising a rotor 1 journalled for rotation on a horizontal spinning axis by means of pivots 2 carried by the ring or rotor bearing frame 3. This ring, in turn, is journalled for oscillation about a second horizontal axis by means of pivots 4, the pivots 4 being supported in pedestals 5 mounted upon the rotatable table or platform 6. The axis of pivots 4, about which the rotor bearing frame 3 turns, preferably extends horizontally at right angles to spin axis 2, so that precession about this axis will be instantly produced by turning the craft in azimuth. The gyroscope is preferably air driven, and for this purpose the entire apparatus or device is preferably enclosed within a casing 7, which is made air-tight and through which air is drawn by creating differential pressure within and without the casing. For example, the air is preferably exhausted from the casing through a valve or outlet 8 by any suitable means, but it is obvious that positive instead of negative air pressure may be used to drive the rotor, if desired.

Air for operating the rotor 1 is conveyed thereto from without casing 7 by means of a conduit 9 leading to an upstanding hollow shaft 10 that is journalled in a frame 11, upon which the platform 6 is rotatably mounted. The frame 11 is shown provided with a cylindrical upper portion 12 that is preferably of insulating material, upon which cylindrical portion the platform or table 6 is mounted for turning thereon. The hollow shaft 10 extends upwardly through the cylindrical portion 12 and has a curved arm 13 attached to the upper end thereof, extending partially around the rotor 1, which arm is provided with a port 14 for directing air against the buckets of rotor 1.

An electric motor 47, shown as of the D. C. type, is mounted upon the frame 11, and the armature of this motor is connected through spur reduction gearing 15 and worm and wheel gearing 16 for turning the hollow shaft 10 within frame 11. The upper end of shaft 10 is secured to the platform 6, whereby turning of this shaft, due to operation of motor 47, causes turning of the platform 6 and the gyroscope.

The rotor bearing frame 3 carries a condenser plate 17 of substantially sector shape, which cooperates with two differential condenser plates 18 and 18' that are positioned side by side and are fixed on an insulating block 27 carried by one of the pedestals 5. With the gyroscope centralized, as shown in the drawings, the condenser plate 17 overlaps equal portions of condenser plates 18 and 18'. In order to centralize the gyroscope, i. e., in order to turn the same to normal position as the airplane resumes a straight course after a turn, spring means may be employed. This means is shown as a coil spring 19 having one end attached to the bracket 20 extending upwardly from one of the pedestals 5, and its other end attached to a pin 21 projecting upwardly from the center line of rotor bearing frame 3. A dash pot is shown, having its cylinder 22 attached to the platform 6 and its plunger 23 attached to the rotor bearing frame 3, for the purpose of damping the gyroscope. A 360° scale 24 is shown carried by the platform 6 and is visible through a window 25 provided in the front wall of the instrument.

The condenser plate 17 is shown as grounded upon the rotor bearing frame 3, which, in turn, is grounded upon the frame 11 through pedestals 5, table 6 and shaft 10. Frame 11 is connected by lead 25' to the cathodes of rectifier tubes 26 and 26' arranged in push-pull. The condenser plates 18 and 18' are insulated from pedestal 5 by the insulating member 27, and are connected by suitable leads and brushes to slip rings 28 and 28', respectively, fixed upon the upper cylindrical portion 12 of the frame 11. These slip rings, in turn, are connected to terminal posts 29, 29', to which leads 30 and 30' are connected. As shown in Fig. 4, these leads 30 and 30' extend to the grids of tubes 26 and 26'. Condenser plate 17, together with condenser plate 18, constitutes part of a tunable circuit also including an inductance coil 31 and a condenser 32. Similarly, condenser plates 17 and 18' constitute part of a tunable circuit also including coil 31' and condenser 32'.

An oscillation generator 33 supplies high frequency current to these tunable circuits through use of coupling coils 34 and 35', the latter being coupled to coils 31 and 31'. The radio frequency signal produced by oscillator 33 and reaching the grid of tubes 26 and 26' may be sharply varied by the adjustment of the condenser plate 17 with respect to plates 18 and 18'. The plates of tubes 26 and 26' are supplied with commercial frequency alternating current from a supply 34' through the respective halves of an impedance or choke coil 135' and resistors 36, 36'. Additional and similar resistors 37 and 37' are connected between leads 38 and 38', and these resistors cooperate with condensers 39 and 39' included in leads 38 and 38' extending from the plates of tubes 26, 26' for supplying time derivative voltages to the grids of tubes 40 and 40', the said resistors completing the circuit for currents resulting from such voltages. A condenser 41 is connected between leads 38 and 38', and condensers 42 and 42' are also connected in series across these leads. Condenser 41 serves to smooth out voltage ripples. Condensers 42 and 42' serve to vary the voltage ratio between the A. C. and D. C. signals. If desired, condensers 42 and 42' may be omitted.

Tubes 40 and 40' are shown as having their plates supplied from a transformer 43 fed from the A. C. supply 34', current from transformer 43 to the plates of these tubes passing through relay coils 44 and 44'. Relay coils 44 and 44' serve to actuate armatures 45 and 45' of switch blades 49 and 49' controlling the supply of current from a battery or other source 46 to the armature of motor 47, having a constantly excited field 48. Springs 24' normally hold switch blades 49 and 49' in engagement with stationary contacts 52, 52'.

In operation, as long as the craft proceeds on a straight course, the condenser plate 17 will remain in its central position equally overlapping condenser plates 18 and 18'. With condenser plate 17 in its central position, as shown in the drawings, the voltage outputs of tunable circuits 31, 32 and 31', 32' are equal, so that the opposing outputs of tubes 26 and 26' fed through leads 38 and 38' to tubes 40 and 40' cause these latter tubes to draw equal currents through relay coils 44 and 44', thereby causing the switch blades 49 and 49' to remain in engagement with contacts 52 and 52' so that motor 47 remains stationary.

As soon as the craft starts to turn, however, the gyroscope will precess, causing plate 17 to move from its central position so as to overlap one of the plates 18 or 18' more than the other, thereby increasing the capacity between these plates. Should the craft turn toward the left in Fig. 3, for example, the gyroscope will precess an amount depending on the rate of turn of the craft, causing condenser plate 17 to move toward the left so as to overlie condenser plate 18 more than condenser plate 18', with the result that the output voltage of the tunable circuit 31, 32 is considerably increased, whereas that of tunable circuit 31', 32' is correspondingly decreased, with the result that unequal currents are drawn by tubes 26 and 26' through the two halves of choke coil 35'. In this case, tube 26 draws a larger current than tube 26'. Thus, differential alternating E. M. F.'s are applied to leads 38 and 38' from supply 34' and pass through condensers 39 and 39' to the grids of tubes 40 and 40', these E. M. F.'s corresponding to the amount of precession of the gyroscope, i. e., the relative displacement of plate 17 with respect to its central position. An unbalanced voltage surge or D. C. component flows in choke coil 135' and in the resistors 36 and 36', the magnitude of which depends on the amount of precession of the gyroscope, and hence upon the rapidity of the turn. This surge component in choke coil 135' causes a voltage drop to appear across this coil as well as across resistors 36 and 36', the total voltage drop between leads 38 and 38' depending as to phase upon the direction of the turn and its magnitude being dependent upon the rate thereof.

If this D. C. component varies, a voltage is induced across the choke coil 135', which induced voltage is in phase with the time rate of change of displacement of the condenser plate 17 from its central position, that is, this voltage is in phase with the time rate of change of the rate of turning, i. e., angular acceleration of the craft due to turn. During the turn two D. C. voltages appear across the leads 38 and 38', one proportional to and in phase with the velocity of the turn, and the other proportional to and in phase with the relative acceleration thereof. The combination of these two voltages is applied to condensers 39 and 39' and if these two voltages are changing, the time rate of change thereof will be applied to the grids of tubes 40 and 40'.

If desired, condensers 39 and 39' may be omitted.

Under the assumption that the turn is to the left, causing the capacity between plates 17 and 18 to increase, the voltage applied to the grids of tube 40 will be in excess of that applied to tube 40', with the result that the current through tube 40 increases while that through tube 40' decreases and relay blade 49 is actuated to engage stationary contact 50 while blade 49' engages contact 52', thereby causing the motor 47 to operate in one direction to effect a turning of platform 6 and the gyroscope 1 to erase the turn, whereby this gyroscope is retained fixed in space, the indications of the scale 24 with respect to pointer 54 carried by frame 11 serving to indicate the amount of turn, the rate at which the card 24 turns with respect to pointer 54 giving indication of the rate of turn.

Should the craft turn to the right, the action is similar with the exception that the tunable circuit 31', 32' will have a larger voltage output, causing motor 47 to operate in the reverse direction to maintain the gyroscope stationary in space, as is desired.

Thus, by observing the card 24 with respect to pointer 54, the aircraft operator is enabled not only to know the total amount of turn for deviation of the craft from course, but also is enabled to know the rate of such deviation and can consequently readily correct for the turn to the desired extent, the card 24 serving as a fixed object, the same as any visible object on the ground would serve in such case. Owing to the use of time derivative potentials, i. e., rate control in the control circuit of motor 47, the system is rendered very sensitive and accurately indicates amount of turn of the craft.

Since the device of this invention has no geographical direction, it is similar to the directional gyroscope in that it will preserve a heading which has been set up.

Although the device is shown in the drawings as operating in azimuth only, it is to be understood that the same may be made to operate about any axis, or a number of axes, if the same is desired, by employing a number of gyroscopes and follow-up motors for stabilizing the respective platforms of the gyroscopes used. It is also obvious that the type of motor 47 employed and its control from the tubes 40 and 40' may be varied within wide limits. Thus, if desired, the current from tubes 40 and 40' may be fed directly into the armature of motor 47 in opposite directions as shown in Fig. 2 of Patent No. 2,126,910 of F. L. Moseley, or a repulsion motor may be used, if desired, as shown in this patent.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an instrument of the character described for showing the direction and amount of deviation of a craft from course, a rotatable support, a constrained gyroscope mounted thereon for precession through an angle dependent upon the rate of turn of the craft, motive means to turn said support, control means including a pick-off from said gyroscope so constructed and arranged as to cause said motive means to be driven in a direction and at a rate dependent upon the direction and, at least in part, upon the extent of precession of said gyroscope so as to counteract said precession, and a course indicator rotatable with said support.

2. In an instrument of the character described, a constrained gyroscope with horizontal spin axis and mounted for precession around an axis perpendicular thereto, means for rotatably supporting said gyroscope about a third axis, motive means for rotating said supporting means to counteract said precession, and control means for said motive means including a pick-off from said gyroscope operated by and upon precession of said gyroscope due to turning about said third axis, to cause said motive means to turn said supporting means in the reverse direction, to thereby maintain the supporting means angularly stationary about its axis of rotation.

3. A direction indicator for aircraft showing the direction and amount of deviation from course, comprising a constrained gyroscope mounted for precession through an angle dependent on the rate of turn of the craft, a compass card indicator, an electric motor for actuating said indicator, and control means comprising tunable circuits including a differential capacity pick-off from said gyroscope and thermionic tube means fed from said tunable circuits for causing said motor and said indicator to be driven in a direction and at a rate respectively dependent upon the direction and a function of the angular precessional displacement of said gyroscope.

4. A direction indicator for aircraft showing the direction and amount of deviation from course, comprising a constrained gyroscope mounted for precession through an angle dependent on the rate of turn of the craft, a compass card indicator, an electric motor for actuating said indicator, and control means comprising tunable circuits including a differential capacity pick-off from said gyroscope, a high frequency source for energizing said tunable circuits, thermionic means fed from said circuits and serving to amplify and rectify the alternating potential output thereof, and relays controlled from the output of said thermionic means for controlling the operation of said motor, whereby said indicator is driven in a direction and at a rate respectively dependent upon the direction and a function of the angular precessional displacement of said gyroscope.

5. A direction indicator for aircraft showing the direction and amount of deviation from course, comprising a constrained gyroscope mounted for precession through an angle dependent on the rate of turn of the craft, a compass card indicator, control means comprising tunable circuits including a differential capacity pick-off from said gyroscope, a high frequency source for energizing said tunable circuits, thermionic means fed from said circuits and serving to amplify and rectify the alternating potential output thereof, said thermionic means having impedance in its output circuit for producing surge potentials, and motive means controlled from said thermionic means and said impedance for actuating said compass card indicator.

6. In an instrument for integrating turning movement, a constrained gyroscope having a horizontal spin axis and adapted to precess in a vertical plane, resilient means for centralizing said gyroscope, a support for said gyroscope turnable about an axis at right angles to the rotating axis of said gyroscope, an indicator carried by said support, a motor for turning said support to suppress said precession, a frictionless electrical pick-off operated by and upon precession of said gyroscope, and a control circuit for said motor connected to said pick-off, said control circuit controlling said motor in response to the precession of said gyroscope and a time derivative thereof.

7. In a gyroscopic instrument of the rate of turn type for showing the direction and amount of deviation of a craft from its course, a constrained gyroscope mounted for precession about an axis normal to the axis of deviation, a turntable support for said gyroscope, motive means for turning said support to stop said precession, control means including a pick-off operated by and upon precession of said gyroscope so constructed and arranged as to cause said motive means to be driven in a direction to stop said precession and at a rate dependent upon the amount and direction of said precession and a time derivative thereof, and a course indicator actuated by said motive means.

8. As a means for controlling the position of a member in response to both its angular rate and angular acceleration comprising a two-degree of freedom rate of turn gyroscope mounted on said member, a pick-off thereon the position of which is altered by precession of said gyroscope responsive to said angular rate, a servo motor controlled by the signal from said pick-off for moving said member, and means for modifying said signal by a time derivative of the signal.

9. As a means for controlling the position of a member in response to both its angular rate and angular acceleration comprising a two-degree-of-freedom, constrained rate of turn gyroscope mounted on said member, a non-contacting electrical pick-off on said gyroscope giving a signal proportional to the extent of precession of said gyroscope corresponding to the angular rate of said member, an amplifying circuit for said signal including means for deriving a time derivative thereof, and a servo motor for moving said member controlled by the output of said circuit.

JOSEPH LYMAN.